May 9, 1950 W. M. ROBINSON 2,506,971

NOISE FILTER

Original Filed Sept. 18, 1942

INVENTOR.
William M. Robinson
BY
[illegible]
ATTORNEY

Patented May 9, 1950

2,506,971

UNITED STATES PATENT OFFICE 2,506,971

NOISE FILTER

William M. Robinson, Fairhaven, Mass., assignor to Cornell-Dubilier Electric Corporation, South Plainfield, N. J., a corporation of Delaware Original application September 18, 1942, Serial No. 458,892. Divided and this application August 2, 1945, Serial No. 608,442

6 Claims. (Cl. 178—44)

This application is a division of application Serial No. 458,892, filed September 18, 1942, and entitled "Electrical filter," now Patent No. 2,383,890.

The present invention relates to anti-interference or noise filters, more particularly to tuned filters of this type which comprise an inductance and a capacitor to produce a filtering effect for a desired frequency or range of disturbing frequencies.

A known construction of a tuned filter utilizes the inherent series inductance of the connecting leads from a capacitor unit to its terminal posts to produce a series resonance effect for a desired frequency or band of frequencies to be eliminated. Since, however, the inherent series inductance varies substantially in different types and sizes of capacitors and may even be different in capacitors of the same type, it is necessary to select a capacitor of suitable design in order to obtain a desired filtering effect or characteristic.

Moreover, since the capacity determines the effectiveness of the filter action and, in particular, the range or band of the frequncies being weakened or suppressed, at best only a compromise solution may be obtained with this type of tuned filter which affords little flexibility in adapting it to and complying with the varying requirements and conditions encountered in practice.

Among the objects of the present invention is, therefore, to provide a tuned noise or anti-interference filter which is both simple in design as well as compact and rugged in construction; which can be manufactured inexpensively; which is substantially unaffected by fluid or moisture penetration or the like; and which may be designed in a simple manner for a desired frequency or range of frequencies to be reduced or eliminated.

Figure 1:
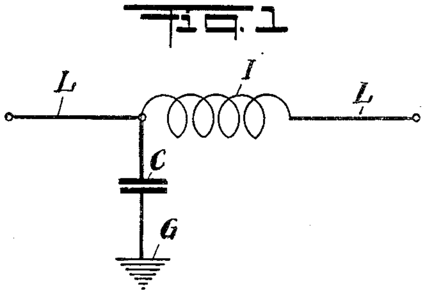
Figure 2:
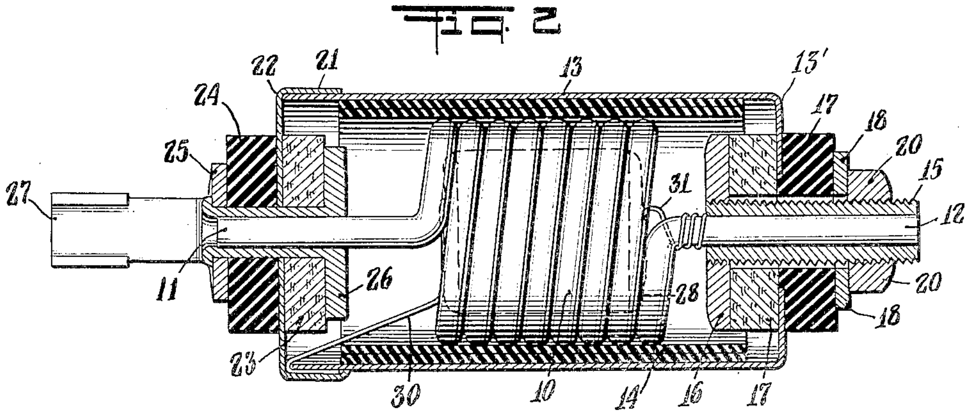

Further objects and advantages of the invention will become more apparent from the following detailed description taken in reference to the accompanying drawing forming part of this specification, and wherein:

Figure 1 is a diagram of the usual type of tuned anti-interference filter for suppressing disturbing or undesirable frequencies in electrical communication devices; and Figure 2 is a cross-sectional view of a filter unit constructed in accordance with the invention.

The diagram shown in Figure 1 is that of a well known noise filter used to suppress frequencies beyond a certain cut-off point determined by the values of the inductance I and the capacity C.

The inductance I is directly connected in series with the line or circuit L to be protected and the condenser C serving as a by-pass is connected between said line, preferably at the entrance point of the inductance, and ground G.

Figure 2 shows a construction of filter of the kind shown in Figure 1 in which the straight-through or main line conductor has the form of a relatively heavy wire 10 wound into a cylindrical coil or helix and having projecting ends 11 and 12 substantially in line with the axis of the helix. This coil has an inductance determined by its dimensions.

Coil 10 is mounted within a cylindrical metal casing 13 having at one end an inturned annular flange 13'. One or more layers 14 of insulating material, such as paper or the like, are provided between the coil and the casing in such a manner that the coil fits snugly in the casing and is insulated therefrom. Alternatively, coil 10 may be wound in a known way on a hollow cylinder of insulating material.

In the construction shown, the coil comprises a wire of sufficient diameter to result in a substantially rigid and self-supporting structure, supporting the entire filter unit including the enclosing casing and the sealing and terminal structure described hereafter.

An externally threaded metal sleeve 15 fits over the end 12 of the coil 10 so as to extend with the end 12 beyond the end of the casing. An internally threaded metal washer 16 is secured to the inner end of the sleeve 15, i. e., on the end adjacent to the coil 10. A resilient washer 17 of cork or the like is interposed between the washer 16 and the inside of flange 13' of the casing, while a further rigid insulating washer 17, for example of Bakelite or the like, is provided on the outside of flange 13'. A further metal washer 18 is placed over the sleeve 15 before a clamping nut 20 by means of which all the washers are clamped up to hermetically seal the casing against sleeve 15 and the coil end 12.

The opposite open end of casing 13 is closed by a metal cap 21 soldered or otherwise connected thereto and having an inturned annular flange 22 with a resilient insulating washer 23 placed against its inside surface and a rigid insulating washer 24 followed by a metal washer 25 engaging the outside surface of flange 22. The washers 23, 24 and 25 are compressed into firm engagement to provide a tight seal for the casing in any convenient manner. Thus, as shown, a tubular rivet 26 is used through which the projecting coil end 11 extends and to which may be attached a connecting lug 27. The outer ends of sleeve 15 and the rivet 26 may be closed with solder so as to seal completely the inside of the casing.

Mounted inside the coil or helix 10 is a rolled condenser unit 28 preferably of the non-inductively wound type as shown in the drawing with the foil edges of opposite polarity projecting at opposite ends of the unit. An insulating spacer which may consist of several turns of paper or the like is wound around the condenser so that the latter fits snugly within the coil 10. The projecting foil edges of one polarity extending beyond one end of the roll 28 are connected to the casing 13, usually at ground potential by means of a metal strip 30 soldered at one end to the foil edges and having its other end inserted between the edges of the casing 13 and the cap 21 so as to make good electrical contact therewith. The projecting foil edges of opposite polarity extending from the opposite end of roll 28 are electrically connected to the coil end 12 as by means of a wire 31 soldered at one end to the foil edges and having its other end wrapped around and soldered to the coil end 12.

The unit may be provided with any suitable mounting bracket clamped or soldered to the casing 13 in a manner well known and shown in the parent application. In use, terminals 15 and 27 are connected in series in the line or circuit to be protected, while casing 13 is grounded in the manner shown in Figure 1.

There is thus provided by the invention a filter for reducing or suppressing noise or other interference in electrical systems or networks, which is both simple and compact as well as rugged in construction and which can be readily designed for any desired cut-off frequency or range of frequencies by the proper values of the capacitative and inductive elements in a manner understood from the foregoing. The coil is made of sufficiently heavy wire to result in a substantially self-supporting structure in the manner shown, serving as a carrier for both the condenser unit and the enclosing, hermetically sealed metal casing.

While there has been shown and described a desirable embodiment of the invention, it is understood that this disclosure is for the purpose of illustration and that obvious changes in shape, proportion and arrangement of parts, as well as the substitution of equivalent elements for those herein shown and described, may be made without departing from the spirit and scope of the invention as defined in the appended claims. The specification and drawing are to be regarded in an illustrative rather than a restrictive sense.

I claim:

1. An electrical filter structure comprising a cylindrical induction coil of relatively heavy wire having opposite axial extensions to form a substantially rigid and self-supporting unit, pairs of compressed washers mounted upon each of said extensions, a relatively thin cylindrical casing surrounding said coil in close fitting relation thereto and having opposite inturned flanges clamped between the adjacent pairs of washers, a rolled capacitor unit insulatingly mounted within said coil in close fitting relation thereto, and means for electrically connecting one electrode of said capacitor to said casing and connecting the other electrode of said capacitor to one of said extensions.

2. An electrical filter structure comprising a cylindrical induction coil of relatively heavy wire having opposite axial extensions to form a substantially rigid and self-supporting unit, pairs of compressed washers mounted upon each of said extensions, the outer one of each of said pairs of washers consisting of rigid material and the inner washers consisting of resilient material, a relatively thin cylindrical casing surrounding said coil in close fitting relation thereto and having opposite inturned flanges clamped between the adjacent pairs of washers, a rolled capacitor unit insulatingly mounted within said coil in close fitting relation thereto, and means for electrically connecting one electrode of said capacitor to said casing and for connecting the other electrode of said capacitor to one of said extensions.

3. An electrical filter structure comprising a cylindrical induction coil of relatively heavy wire having opposite axial extensions to form a substantially rigid and self-supporting unit, pairs of compressed washers mounted upon each of said extensions, the outer one of each of said pairs of washers consisting of rigid material and the inner washers consisting of resilient material, a relatively thin cylindrical metal casing insulatingly mounted upon said coil in close fitting relation thereto and having opposite inturned flanges each clamped between one of said pairs of washers, a rolled capacitor unit insulatingly mounted within said coil in close fitting relation thereto, and means for electrically connecting one electrode of said capacitor to said casing and connecting another electrode of said capacitor to one of said extensions.

4. An electrical filter structure comprising a cylindrical induction coil of relatively heavy wire having opposite axial extensions to form a substantially rigid and self-supporting unit, pairs of washers mounted upon each of said extensions, means for compressing each of said pairs of washers into firm engagement consisting of a metal sleeve mounted upon each of said extensions and having opposite flanges pressed against each other and into engagement with the respective washers, a relatively thin cylindrical casing surrounding said coil in close fitting relation thereto and having opposite inturned flanges clamped between the adjacent pairs of washers, a rolled capacitor unit insulatingly mounted within said coil in close fitting relation thereto, and means for electrically connecting one electrode of said capacitor to said casing and for connecting the other electrode of said capacitor to one of said extensions.

5. In a filter structure as claimed in claim 4, wherein the outer one of said pairs of washers consists of rigid material and the inner washers consists of resilient material.

6. In a filter structure as claimed in claim 4, wherein said casing consists of relatively thin metal insulated from said coil by an intervening insulating layer.

WILLIAM M. ROBINSON.

REFERENCES CITED

The following references are of record in the file of this patent:

UNITED STATES PATENTS

| Number | Name | Date |
|---|---|---|
| 1,913,532 | Bohner | June 13, 1933 |
| 1,972,268 | Lesh | Sept. 4, 1934 |
| 2,088,454 | Whisk | July 27, 1937 |
| 2,374,084 | Dubilier | Apr. 17, 1945 |
| 2,422,458 | Amy et al. | June 17, 1947 |